United States Patent
Biegelsen

(10) Patent No.: US 8,829,413 B2
(45) Date of Patent: *Sep. 9, 2014

(54) SWITCHABLE REFLECTIVE LAYER FOR WINDOWS AND OTHER OPTICAL ELEMENTS

(75) Inventor: David K. Biegelsen, Portola Valley, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 245 days.

This patent is subject to a terminal disclaimer.

(21) Appl. No.: 13/335,732

(22) Filed: Dec. 22, 2011

(65) Prior Publication Data

US 2013/0161493 A1 Jun. 27, 2013

(51) Int. Cl.
*G02B 26/00* (2006.01)
(52) U.S. Cl.
USPC .................. 250/214 AL; 250/216; 250/229; 359/296; 345/107
(58) Field of Classification Search
CPC .. G02B 26/00; G02B 26/026; G02B 26/0816; G09F 9/37; G09F 9/372; G09G 3/3453
USPC ............ 250/216, 203.1, 203.4, 214 AL, 229; 359/295, 296, 851, 853, 872; 345/107; 136/246

See application file for complete search history.

(56) References Cited

U.S. PATENT DOCUMENTS

| 5,767,826 | A | * | 6/1998 | Sheridon et al. | ................ 345/84 |
| 6,487,002 | B1 | | 11/2002 | Biegelsen | |
| 6,612,705 | B1 | * | 9/2003 | Davidson et al. | ............. 359/851 |
| 6,846,377 | B2 | | 1/2005 | Biegelsen et al. | |
| 7,133,183 | B2 | | 11/2006 | Rabinowitz | |
| 7,247,790 | B2 | * | 7/2007 | Rabinowitz | .................. 136/246 |
| 2005/0195465 | A1 | | 9/2005 | Rabinowitz | |

* cited by examiner

*Primary Examiner* — Kevin Pyo
(74) *Attorney, Agent, or Firm* — Marger Johnson & McCollom

(57) ABSTRACT

Reflective systems include a reflective element secured to an optical element. The reflective element is a switchable reflective layer that is switched by an alignment mechanism electrically coupled to a controller that sends data instructing the alignment mechanism that various light conditions exist.

19 Claims, 6 Drawing Sheets

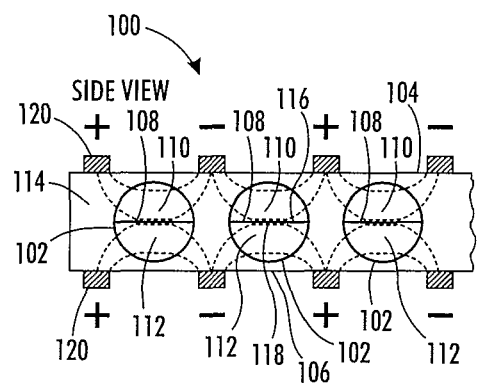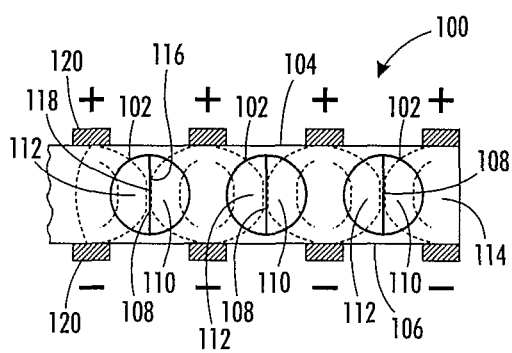
FIG. 1A  FIG. 1B
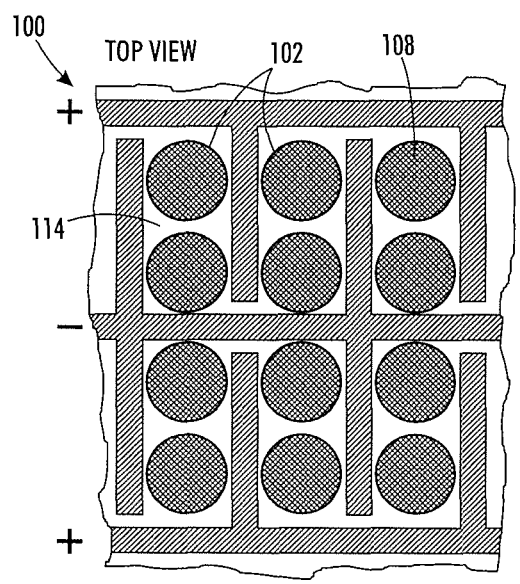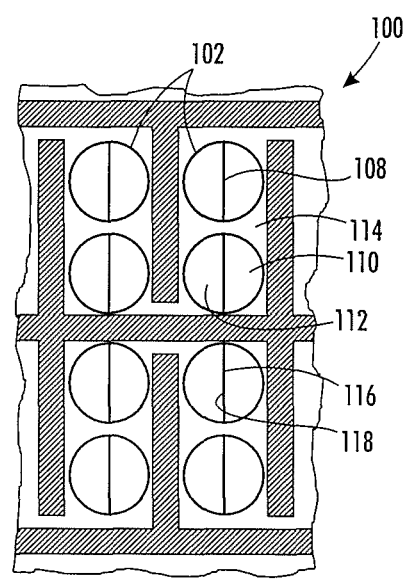
FIG. 2A  FIG. 2B

SWITCHABLE REFLECTIVE LAYER FOR WINDOWS AND OTHER OPTICAL ELEMENTS

CROSS-REFERENCE TO RELATED APPLICATIONS

This application is related to U.S. patent application Ser. No. 13/335,720, entitled, "Switchable Reflective Layer for Windows & Other Optical Elements," filed on Dec. 22, 2011, and incorporates by reference the disclosure herein.

BACKGROUND

Rotating element sheet material is mainly used as reusable paper that can be manipulated to display images, text, and the like. It generally consumes low power because it only requires power when the rotating elements must be rotated and it can be reused thousands of times, making it an attractive reusable resource. Examples include electronic readers in which text and images can be changed by manipulating rotating elements in the sheet material to display the desired text and images. In this example, the rotating elements display various colors and oftentimes include two color choices. Depending on the manner in which the rotating elements are aligned, different colors that vary across a wide spectrum of colors can be displayed as the desired text and images. The limitation that the rotating element sheet material displays colors limits its use beyond display elements and has prevented this technology from becoming widely adopted.

Some attempts have been made to expand the utility of the rotating element sheet material, such as in U.S. Pat. No. 7,133,183 to Rabinowitz, entitled "Micro-Optics Solar Energy Concentrator," which is primarily concerned with solar concentrator micro-mirror cavities found in a single sheet, rather than two sheets, so that accurate alignments and near frictionless rotation can be achieved for purposes of reflecting light onto solar collection panels for improving solar power efficiency. This application is also very narrow and specific to solar energy collection.

Accordingly, there remains a need for an improved rotating element sheet material that is capable of broad applications.

SUMMARY

An embodiment includes a reflective element having multiple rotatable gyricon elements embedded between a first layer and a second layer. The gyricon elements have a first portion and a second portion that each have respective refractive indices and materials. A reflective plane separates the first portion and the second portion. The reflective element also includes an alignment mechanism that causes one or more of the rotatable gyricon elements to rotate to a first position under a first condition and to rotate to a second position under a second condition.

Another embodiment includes a method of reflecting light that includes aligning gyricon elements in a reflective element in a first position under a first condition and in a second position under a second condition. The reflective element is any suitable reflective element such as the reflective element previously described.

In yet another embodiment, a reflecting system includes a reflective element secured to an optical element, such as the optical element described above. Alternative reflective elements include a single layer or some other type of switchable reflective element. A controller is electrically coupled to the alignment mechanism of the reflective element such that it sends data to the alignment mechanism that includes information that instructs the alignment mechanism that the first, second or some other condition exists. Multiple reflective elements may be electrically coupled to the same controller, in a networked fashion.

BRIEF DESCRIPTION OF THE DRAWINGS

FIGS. 1A and 1B show side views of a reflective element under a first condition and a second condition, respectively, according to an embodiment.

FIGS. 2A and 2B show top views of the reflective element shown in FIGS. 1A and 1B under a first condition and a second condition, respectively.

DETAILED DESCRIPTION

Figure 3A:
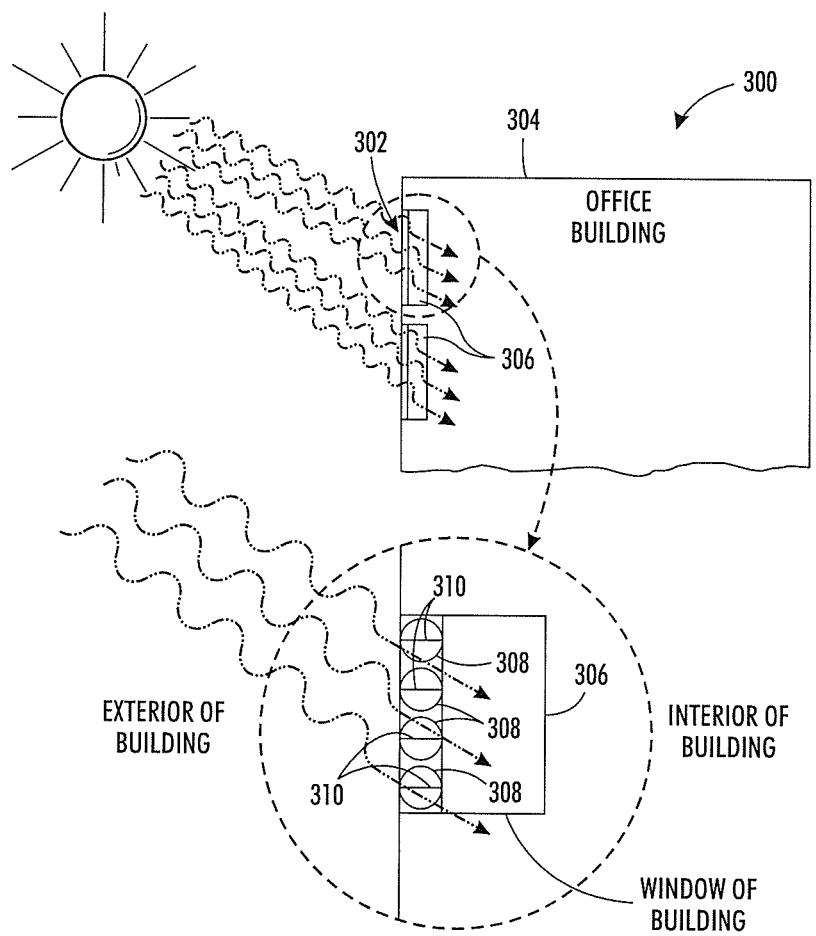
FIGS. 3A-3D show example reflective elements applied to windows in a building, according to aspects of the disclosure.

Reflecting systems include one or more reflective elements that can be manipulated to reflect light, as needed. Some example reflecting systems have multiple, interconnected reflective elements that alternate between two or more positions. These positions correspond to transmissive and reflective positions, in which the reflective element transmits light through itself and reflects light from its surface, respectively. Variations include positioning the reflective element(s) to reflect a portion and transmit a portion of the light. Reflecting systems disclosed herein include examples in which multiple reflective elements transmit and reflect light across a gradient of transmissive and reflective states. These systems are manually controlled in some examples or can be controlled by a sensor that receives data, such as a change in ambient conditions, that causes the reflective elements to reflect or transmit light according to the data received by the sensor.

The disclosed reflecting systems have many applications, specifically as a way to reflect light from optical elements, such as windows in a building or vehicle, eyeglasses, or the like. For example, reflective elements may be applied to a window in a building or vehicle. When sun or other light is very bright, the reflective elements may be positioned in a reflective state such that most or all of the light is reflected away from the window and does not enter the interior of the building or vehicle. When the sun or other light is low, or relatively absent, such as at night, the reflective elements may be positioned in a transmissive state such that most or all of the available light is transmitted through the reflective elements into the interior of the building or vehicle. In the example systems that offer an option along a gradient between the transmissive state and the reflective state, sun or other light of varying intensities causes the reflective elements to be positioned somewhere between the reflective and the transmissive state. The reflecting systems offer any suitable number of options for the degree of transmission of the light through the reflecting elements.

Other applications of this technology include directing sun or other light toward or away from various locations, depending on whether the light is an intrusion or a welcomed addition. For example, solar panels that generate energy from received sun light may be improved by directing sun light toward the collection panels. Additional sun light may be received at the solar collection panels if the disclosed reflecting system directs sun light toward the collection panels that would otherwise be directed elsewhere. More solar energy is generated through the use of such reflecting systems.

The reflective elements of the disclosed reflecting systems include rotatable elements embedded between two layers of bonded material, such as the rotatable elements described in U.S. Pat. No. 6,487,002 to Biegelsen, which is entitled, "Large Area Micro-Structure Template for Creation of Closely Packed Arrays" and U.S. Pat. No. 6,846,377 to Biegelsen, et al., which is entitled, "System and Method for Rotatable Element Assembly and Laminate Substrate Assembly," the disclosures of which are both herein incorporated by reference. Examples of the rotating elements are gyricon beads, although other rotatable elements may be used.

FIGS. 1A and 1B show a portion of a reflective element 100 having rotatable elements 102 embedded between two layers 104, 106 of bonded materials, in a first, reflective position and a second, transmissive position, respectively. This portion of the reflective element 100 is relatively thin and can be applied as a film to optical elements, such as windows. The film may be removable and reusable and have any other suitable qualities for securing the film to the optical elements. Some reflective elements 100 include an adhesive or other attachment element so that one surface, such as the first layer 104, is securable to and optionally removable from optical elements.

Example reflective elements 100 include multiple rotatable gyricon elements 102 embedded between a first layer 104 that is bonded to a second layer 106, as shown in FIGS. 1A and 1B. A reflective plane 108 separates a first portion 110 and a second portion 112 of the gyricon elements 102. The first 104 and second 106 layers are any suitable substrate and may include silicon, for example, or any other transparent, flexible materials. The reflective element 100 also may include a fluid 114, such as isoparaffinic fluids, which swells the material in which the gyricon elements 102 are suspended and facilitates rotation of the rotatable gyricon elements 102. The gyricon elements 102 may be embedded in cavities defined between the first 104 and second 106 layers and rotate freely in the cavities with the help of the fluid 114. In some configurations, the first 104 and second 106 layers have complementary cavities that house individual gyricon elements 102 that freely rotate within their respective cavities.

The rotatable gyricon elements 102 may be round to facilitate easy rotation between the first 104 and the second 106 layers. The gyricon elements 102 shown in FIGS. 1A and 1B are spherical, although other gyricon elements 102 may be cylindrical. The reflective plane 108 separates each gyricon element 102 into at least two, and sometimes three or more portions. FIGS. 1A and 1B show bi-sectional gyricon elements 102 in which the reflective plane 108 separates the gyricon element 102 into two portions 110, 112. Alternative configurations include a tri-sectional reflective plane that is shaped to separate the gyricon elements into three portions. The number of portions into which the gyricon elements 102 are separated corresponds to the number of "definitive states" into which the gyricon elements 102 can be positioned.

For example, bi-planar gyricon elements 102 with a reflective plane 108 that separates the gyricon elements 102 into two portions 110, 112 have a transmissive and a reflective "definitive" state, depending on the position of the reflective plane 108 with respect to the incoming light, as shown in FIGS. 1A-2B. When the reflective plane 108 is positioned at an angle that is parallel to the first layer 104 and the second layer 106, incoming light is reflected off of the reflective plane 108. When the reflective plane 108 is positioned at an angle that is perpendicular to the first layer 104 and the second layer 106, incoming light is transmitted through the gyricon elements 100 and thus through the optical element to which it is secured.

Both the bi-planar and tri-planar gyricon elements 100 may be positioned somewhere along a gradient between their respective definitive states. In the bi-planar example described above, the gyricon elements 100 may be positioned at an angle between 0° and 90° with respect to the first layer 104 and the second layer 106. In this configuration, some portion of light emitted onto the reflective elements 100 is transmitted through the gyricon elements 102 while some of the light is reflected off of the reflective plane 108 away from the reflective element 100. The angle at which the reflective plane 108 is positioned with respect to the first 104 and second 106 layers determines the amount of light that is transmitted through and reflected from the reflective element 100.

In FIGS. 1A and 1B, the reflective plane 108 is an equatorial plane that separates the gyricon elements 100 into two equal portions, such that the first portion 104 and the second portion 106 are approximately equal in size and shape. Other configurations have a reflective plane 108 that separates the gyricon elements 102 into non-uniform sizes and shapes. The first portion 110 and the second portion 112 have respective refractive indices and materials. Some example reflective elements 100 include first 110 and second 112 portions that have substantially the same refractive indices and/or includes the same or some of the same materials. Some gyricon elements 100 include first 110 and second 112 portions that have transparent material(s) such that light emitted onto the reflective element 100 can be transmitted through the gyricon elements 102. In the examples in which the gyricon elements 102 are suspended in oil 114 or another fluid, the oil 114 may have the same refractive index as the first portion 110, the second portion 112, and the reflective plane 108. When all materials share the same refractive index, there is minimal light scattering and maximum light transmission.

In the examples shown in FIGS. 1A and 1B, the reflective plane 108 is an equatorial plane that is flat and smooth, although it may have surface contour or shape in alternative configurations. The equatorial plane 108 has a refractive index that is substantially the same as the refractive indices of the first 110 and second 112 portions, although in alternative configurations the equatorial plane 108 has a different refractive index. The reflective plane 108 may include a conductive material, such as a metal. Some reflective planes 108 include evaporative aluminum or any other suitable materials. The reflective plane 108 may be created in any suitable manner, such as by an aluminum evaporator applying an equatorial reflective layer between two portions before they are merged together. The first portion 110 and the second portion 112 also may be glued together with the reflective plane 108 between them. Any suitable adhesive or other merging method or mechanism can be used.

The reflective plane 108 may have a first surface 116 that is reflective and an opposing second surface 118 that is either reflective or that includes a colored material. The colored material may be optically-absorbing to light or light-scattering in nature. In the example in which the first surface 116 is reflective and the second surface is a colored material, when the reflective elements 100 are positioned parallel with the first layer 104 and the second layer 106, as shown in FIGS. 1A and 2A, the first surface 116 reflects light and the second surface 118 includes a material having a color or image. This configuration may be useful in a reflective element that is applied to windows on a building so that when the light is reflected away from the window by the first surface 116 of the reflective element, the second surface 118 of the reflective element 100 displays an image on the interior of the building.

An alignment mechanism of the reflective elements 100 causes some portion of the gyricon elements to rotate to a first position when a first condition occurs and to rotate to a second position when a second condition occurs. The first and second positions of the gyricon 102 elements correspond to changing the angle of the reflective plane 108 and thus the amount of light that is reflected from and transmitted through the gyricon elements 102. Any suitable mechanism for rotating the gyricon elements 102 can be used, such as the electrodes 120 shown in FIGS. 1A and 1B. Some electrodes 120 are transparent and may be positioned along the first 104 and/or the second 106 layers such that they least interfere with the light being reflected from or transmitted through the gyricon elements 102. For example, the electrodes 120 are positioned between the gyricon elements 102 of the reflective elements 100 shown in FIGS. 1A and 1B.

FIGS. 1A and 1B show two different conditions applied to the reflective elements 100 by the electrodes 120. FIG. 1A shows alternating negative and positive potential applied to the electrodes 120 along the first layer 104 and the second layer 106. The electrodes 120 on the first layer 104 that are aligned with the electrodes 120 on the second layer 106 have the same potential, negative or positive, in this condition, which causes the electromagnetic fields caused by the potential from the electrodes to align the conductive reflective plane 108 in a position parallel with the first 104 and second 106 layers. Alternative alignment mechanisms include dipolar forces due to the zeta potential differences arising from the use of different material surfaces of the two gyricon portions 110 and 112, electret formation in the gyricon particles, and other magnetic and/or electric potential alignment options.

FIG. 1B shows each electrode 120 on the first layer 104 having a positive potential and each electrode 120 on the second layer 106 having a negative potential such that the electromagnetic field created causes the reflective plane 108 to be aligned in a position that is perpendicular with the first 104 and second 106 layers. FIGS. 2A and 2B are a top view of FIGS. 1A and 1B, respectively. The gyricon elements 102 remain in a given state or position when rotated until another condition occurs and rotates the gyricon elements 102 again. Power is required only when causing the rotatable gyricon elements 102 to rotate.

Turning now to FIGS. 3A-3D, reflecting systems 300 are shown that incorporate one or more of the reflective elements 302 described in relation to FIGS. 1A-2B. The reflecting systems 300 shown are examples applied to windows of a building, but these systems are applicable to any suitable optical elements. The reflecting systems 300 may include multiple networked reflective elements 302 and various controllers, processors, memory, power supplies, and sensor(s). In an embodiment, the reflecting system 300 includes a power source, such as a battery, and an intermittent switch that allows a user to set the state of the reflective elements 302 such that they are transmitting or reflecting (or anywhere in between). When the state of the reflective elements 302 is not be changed, no power is connected to the reflecting system 300.

Figure 3B:
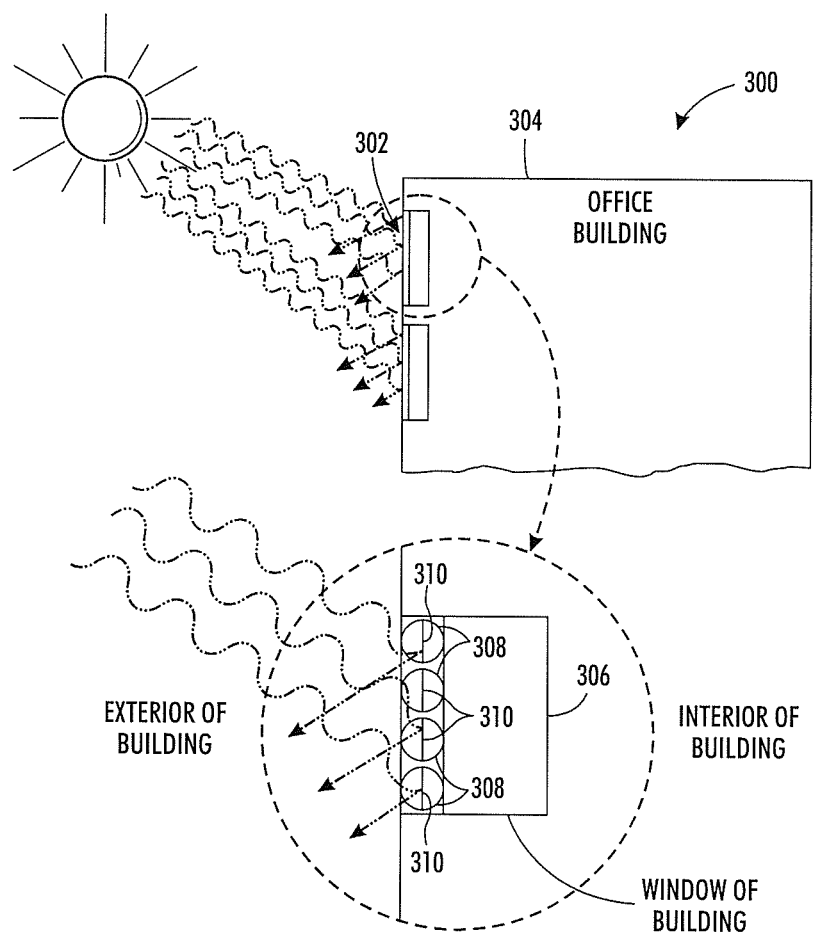

FIG. 3A illustrates an office building 304 having two windows 306 on which two respective reflective elements 302 are secured. The two reflective elements 302 each align their respective gyricon elements 308 such that the reflective planes 310 are perpendicular to the surface of the window 306 (and the first layer and second layer of the reflective elements). This configuration permits the maximum amount of sunlight to enter the interior of the building 304. In this example, the two reflective elements 302 work in unison and are both positioned so that the sunlight may enter each window at the same time. FIG. 3B shows the same two windows 306 of the office building 304 shown in FIG. 3A, except that the gyricon elements 308 are rotated so that their reflective planes 310 are parallel with the surface of the window 306 (and the first layer and second layer of the reflective elements). This configuration reflects the maximum amount of sunlight away from the window 306 of the building 304 and provides as much reflection as possible so that as little sunlight as possible enters the interior of the building 304. Each of these situations may be helpful in conserving energy for heating and cooling the building 304. Any suitable number of windows 306 with this example office building 304 may be networked together to simultaneously reflect or transmit light.

Figure 3C:
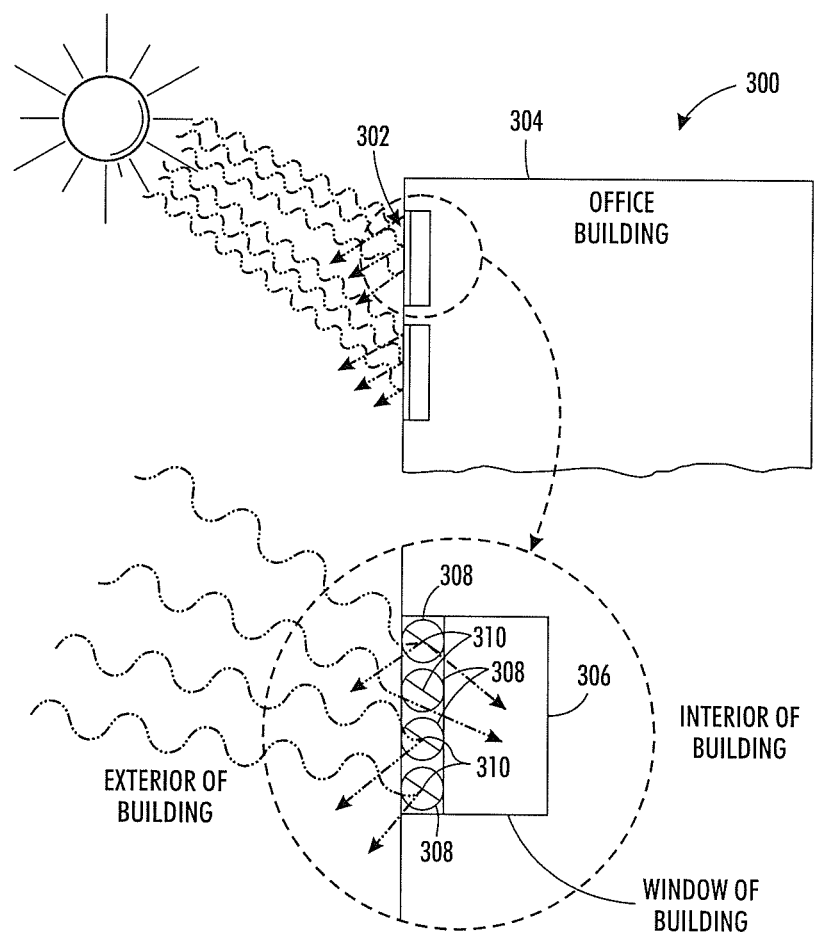

FIG. 3C shows the same office building 304 with two windows 306 with respective networked reflective elements 302. In this example, the reflective elements 302 reflect some light away from the window 306 and transmit some light into the interior of the building 304. These reflective elements 302 may be positioned such that their respective reflective planes are positioned at an angle (any non-zero angle) with respect to their first layer and second layer. Any suitable means may be used to position the reflective elements 302 at these angles. One suitable means would sequence voltages to sets of rows of electrodes such that the angle of the reflective layer of the localized gyricon elements would be positioned at angles between zero and ninety degrees. Time sequencing also may be included in this example so that the gyricon elements could be positioned separately. Another option would include pulsing the gyricon elements along the gradient between their definitive transmissive and reflective states (e.g., pulsing bursts of power to the gyricon elements). Longer pulses or a greater number of pulses cause the gyricon elements to rotate more while shorter pulses cause the reflective layer of the gyricon elements to be positioned at an angle between zero and ninety degrees.

Figure 3D:
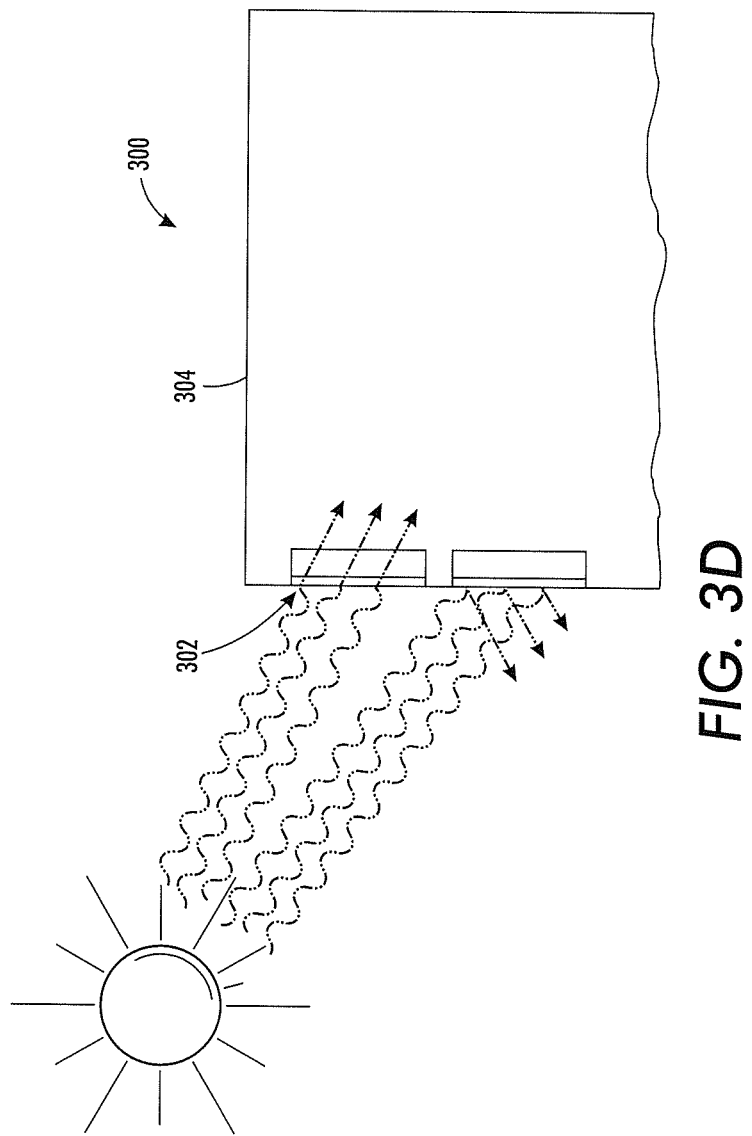

FIG. 3D shows the same office building 304 with two windows 306 with respective networked reflective elements 302. However, these reflective elements 302 reflect different amounts of sunlight. One of the reflective elements 302 transmits most or all of the sunlight to the interior of the building 304 while the other reflective element 304 reflects most or all of the sunlight away from the window 306 to which it is secured. This configuration permits the reflecting system 300 to customize the sunlight received in individual areas or rooms within the office building 304. In an alternative example, a portion of a single reflective element reflects sunlight while another portion transmits it so that sunlight is received through a portion rather than the entirety of a single window. Any suitable configuration of networked windows may be implemented.

Figure 4:
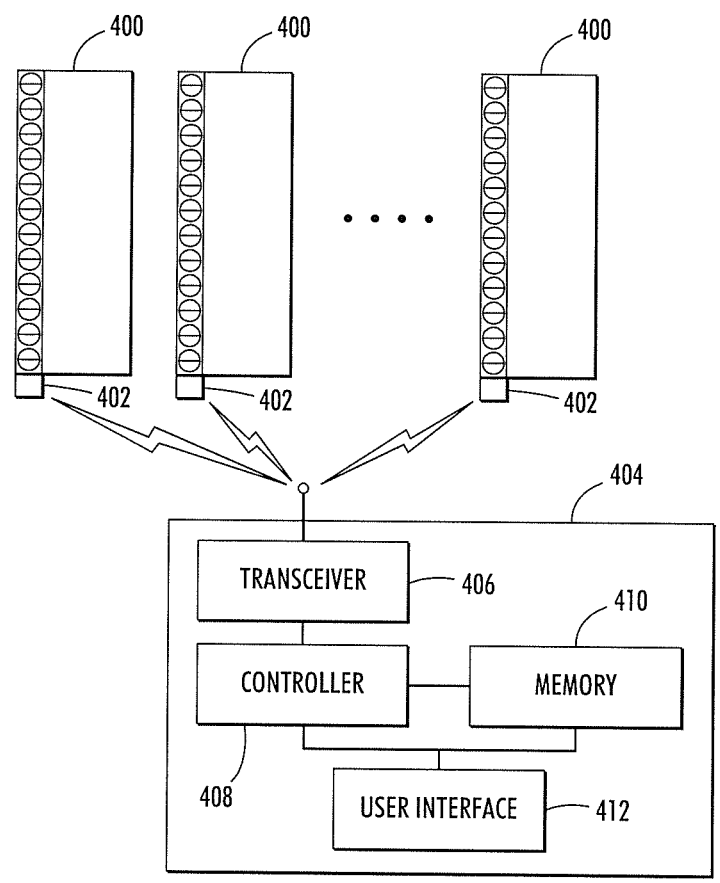
FIG. 4 shows a functional block diagram of a reflecting system that includes multiple reflective elements, according to examples.

FIG. 4 shows a functional block diagram of a group of networked reflective elements 400. A sensor 402 is electrically coupled to each of the reflective elements 400 and senses one or more characteristics of the ambient environment around the reflective element(s) 400. For example, the sensor 402 includes a photodiode that senses the amount of sunlight in the ambient environment around the optical element to which the reflective element 400 in attached. The sensor 402 may be attached to or located remotely from the reflective element 400. For example, a photodiode is attached to each reflective element 400 shown in FIG. 4. In an alternative example, a single photodiode may be placed in a central location among a group of reflective elements 400. In yet another example, a reflective element 400 has a sensor 402 in the space opposite to the source of the light. The sensor can be used in a feedback mode to maintain a desired level of illumination within the space. In all configurations, the reflective elements 400 may be positioned to reflect and/or transmit light according to data received by the photodiode(s).

In another reflecting system, the sensor 402 receives ambient characteristics or other data and directs the reflective elements 400 to reflect light in a specific direction, such as toward or away from a particular location. For example, a solar power collection system may include the disclosed reflecting system such that sunlight is directed toward the solar collection panels to maximize the captured solar energy. Any suitable use of this direction capability may be used.

The reflective elements 400 shown in FIG. 4 are wirelessly connected to each other and a central computing device 404, although these connections may be hard-wired, if desired. The central computing device 404 includes a transceiver 406 for transmitting and receiving signals to and from the reflective elements 400. The central computing device 404 also includes a controller 408 that sends instructions to one or more of the reflective elements 400 to rotate to a particular position. An optional memory 410 may store information relating to a schedule for rotating the reflective elements 400 based on any criteria, such as time of the day, time of the year, current weather conditions, and the like. The central computing device 404 further may include an optional user interface 412 for receiving information from a user and allowing a user to enter data into the central computing device 404 such as a new schedule for rotating various reflective elements.

In yet another embodiment, a reflecting system includes a reflective element secured to an optical element, such as the optical element described above. Alternative reflective elements include a single layer or some other type of switchable reflective element. More specifically, some reflective elements include a uniform monolayer with rotatable gyricon elements that rotate and function in a manner very similar to the double-layer configurations described above. Any suitable monolayer configuration may be included in one or more reflective elements. A controller is electrically coupled to the alignment mechanism of the reflective element such that it sends data to the alignment mechanism that includes information that instructs the alignment mechanism that the first, second or some other condition exists. Multiple reflective elements may be electrically coupled to the same controller, in a networked fashion.

It will be appreciated that variations of the above-disclosed reflecting system and other features and functions, or alternatives thereof, may be desirably combined into many other different systems, methods, or applications. For example, methods of reflecting light may use any one or more of the above reflective elements. Also various presently unforeseen or unanticipated alternatives, modifications, variations, or improvements therein may be subsequently made by those skilled in the art which also are intended to be encompassed by the following claims.

The invention claimed is:

1. A reflecting system, comprising:
an optical element;
a removable film applied to the optical element, the removable film having a reflective element that includes:
a first layer;
a second layer bonded to the first layer;
a plurality of rotatable gyricon elements embedded between the first layer and the second layer, each of the plurality of rotatable gyricon elements including:
a first portion having a first refractive index and including a first material;
a second portion having a second refractive index and including the first material; and
a reflective plane that separates the first portion and the second portion;
an alignment mechanism that causes at least a portion of the plurality of rotatable gyricon elements to rotate to a first position under a first condition and to rotate to a second position under a second condition; and
a controller electrically coupled to the alignment mechanism such that the controller sends data to the alignment mechanism with information that instructs the alignment mechanism that at least one of the first condition and the second condition exists.

2. The system of claim 1, wherein the optical element is a window.

3. The system of claim 2, wherein the window is in at least one of a building and a vehicle.

4. The system of claim 1, wherein the first position aligns the reflective plane of each of the plurality of rotatable gyricon elements in parallel with a longitudinal axis of the optical element.

5. The system of claim 4, wherein the second position aligns the reflective plane of each of the plurality of rotatable gyricon elements perpendicular to the longitudinal axis of the optical element.

6. The system of claim 1, wherein the first position aligns the reflective plane of each of the plurality of rotatable gyricon elements at an angle between 0 and 90 degrees with respect to a longitudinal axis of the optical element.

7. The system of claim 1, further comprising a sensor electrically coupled to the controller, wherein the sensor is configured to sense at least one characteristic of an ambient environment of the reflecting system.

8. The system of claim 7, wherein the sensor is secured to or positioned adjacent to the removable film.

9. The system of claim 7, wherein the sensor is positioned remotely from the removable film.

10. The system of claim 7, wherein the information that the controller sends to the alignment mechanism is based at least in part on the at least one characteristic.

11. The system of claim 7, wherein the sensor is a photodiode.

12. The system of claim 11, wherein the photodiode senses light in the ambient environment of the reflecting system.

13. The system of claim 12, wherein the information that the controller sends to the alignment mechanism is based at least in part on the light sensed by the photodiode.

14. A reflecting system, comprising:
an optical element;
a removable film applied to the optical element, the removable film having a reflective element that has a plurality of rotatable gyricon elements that each include:
a first portion having a first refractive index and including a first material;
a second portion having a second refractive index and including the first material; and
a reflective plane that separates the first portion and the second portion;
an alignment mechanism that causes at least a portion of the plurality of rotatable gyricon elements to rotate to a first position under a first condition and to rotate to a second position under a second condition; and
a controller electrically coupled to the alignment mechanism such that the controller sends data to the alignment mechanism with information that instructs the alignment mechanism that at least one of the first condition and the second condition exists.

15. The reflecting system of claim 14, wherein the optical element includes a window.

16. The reflecting system of claim 14, wherein the optical element is a first optical element, the removable film is a first removable film, and the alignment mechanism is a first alignment mechanism, and further comprising:
- a second optical element;
- a second removable film applied to the optical element, the second removable film having a second reflective element that has a plurality of rotatable gyricon elements that each include:
  - a first portion having a first refractive index and including a first material;
  - a second portion having a second refractive index and including the first material; and
  - a reflective plane that separates the first portion and the second portion; and
- an alignment mechanism that causes at least a portion of the plurality of rotatable gyricon elements of the second removable film to rotate to a first position under a first condition and to rotate to a second position under a second condition.

17. The reflecting system of claim 16, wherein the controller is electrically coupled to the second alignment mechanism such that the controller sends data to the second alignment mechanism with information that instructs the second alignment mechanism that at least one of the first condition and the second condition exits.

18. The reflecting system of claim 17, wherein the controller sends data to the first alignment mechanism and the second alignment mechanism that the first condition exists.

19. The reflecting system of claim 17, wherein the controller sends data to the first alignment mechanism that the first condition exists and sends data to the second alignment mechanism that the second condition exists.

* * * * *